(No Model.)
H. HOBBS.
EXTENSIBLE DENTAL ENGINE BRACKET.
No. 509,901. Patented Dec. 5, 1893.
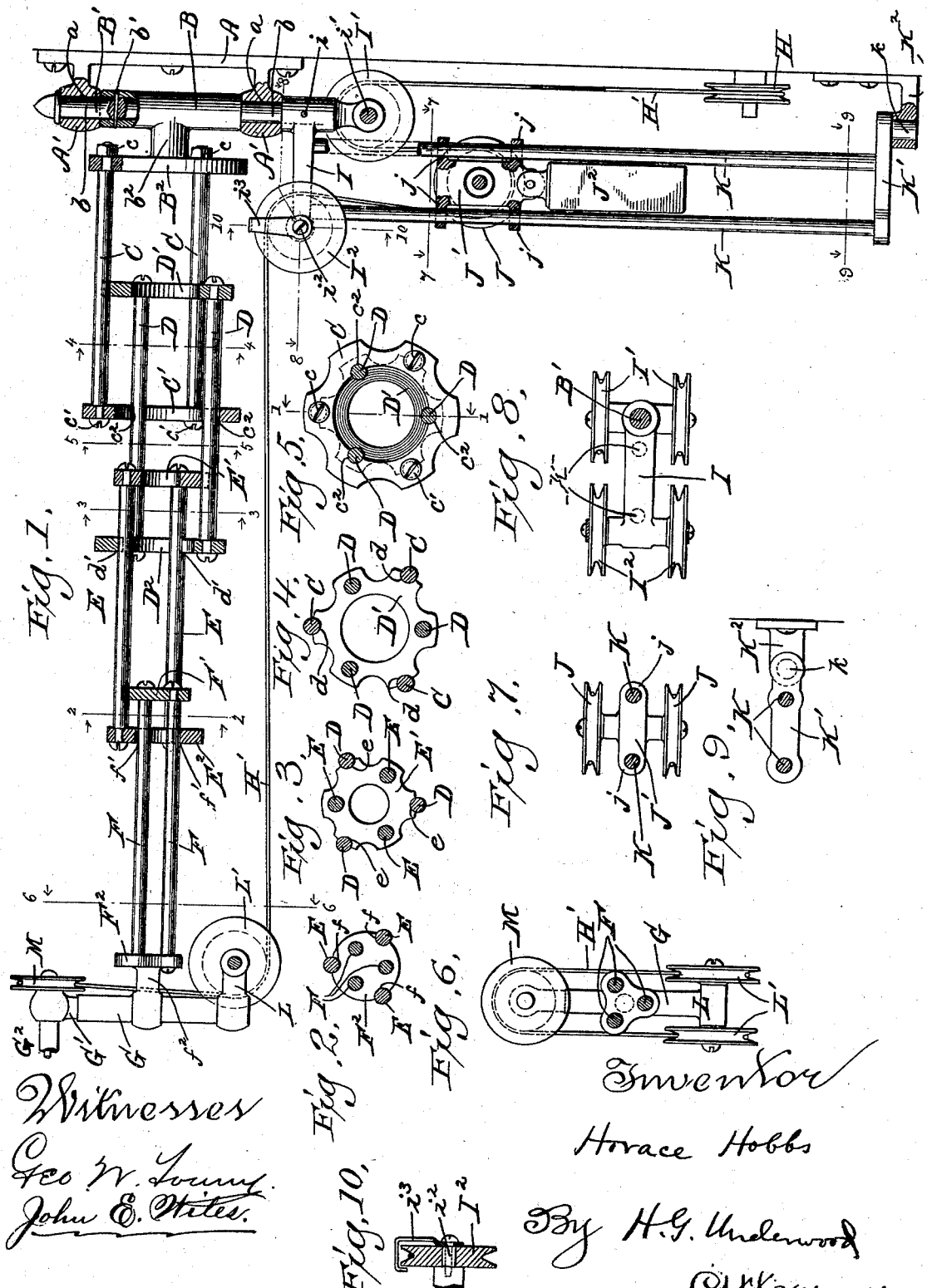
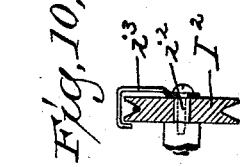
Witnesses
Geo. W. Loury
John E. Wites.
Inventor
Horace Hobbs
By H.G. Underwood
Attorney

UNITED STATES PATENT OFFICE.

HORACE HOBBS, OF MILWAUKEE, WISCONSIN, ASSIGNOR OF ONE-HALF TO AUGUSTUS W. FRIESE, OF SAME PLACE.

EXTENSIBLE DENTAL-ENGINE BRACKET.

SPECIFICATION forming part of Letters Patent No. 509,901, dated December 5, 1893.

Application filed August 22, 1892. Serial No. 443,692. (No model.)

*To all whom it may concern:*

Be it known that I, HORACE HOBBS, a citizen of the United States, and a resident of Milwaukee, in the county of Milwaukee, and in the State of Wisconsin, have invented certain new and useful Improvements in Extensible Tool-Carrying Brackets for Power-Actuated Devices; and I do hereby declare that the following is a full, clear, and exact description thereof.

My invention relates to new and useful improvements in the construction of extensible brackets which are designed for carrying power actuated devices, such as dental tools, cloth cutting devices and the like.

My said invention consists in the matters hereinafter described and pointed out in the appended claims.

In the accompanying drawings illustrating my invention: Figure 1 is a vertical longitudinal section of my improved device taken on line 1—1 of Fig. 5. Figs. 2, 3, 4, 5, and 6, are vertical cross sectional views of the same taken on lines 2—2, 3—3, 4—4, 5—5, and 6—6 respectively of Fig. 1. Fig. 7 is a horizontal sectional view taken on line 7—7 of Fig. 1. Fig. 8 is a similar view taken on line 8—8 of Fig. 1. Fig. 9 is a horizontal sectional detail view taken on line 9—9 of Fig. 1. Fig. 10 is a vertical sectional detail view taken on line 10—10 of Fig. 1.

In said drawings:—A represents a suitable plate adapted for engagement with any desired support for the bracket, and provided with horizontal extending arms $A'$ $A'$ having vertically arranged bearings $a$ $a$ therein.

B represents a vertically arranged sleeve through which is passed a spindle $B'$, which is journaled above and below the said sleeve, in the bearings $a$—$a$, as at $b$ $b$, said spindle $B'$ being also preferably keyed or pinned to said sleeve, as at $b'$. A horizontally extending arm $b^2$ is provided upon the central part of the sleeve B, and carries upon its outer end a disk or plate $B^2$, as shown in Fig. 1. Secured to this plate in any convenient manner, as by nuts $c$ $c$, are two or more parallel, horizontal rods C C, which are similarly engaged at their outer ends, as at $c'$ $c'$ with another plate $C'$.

The plate $C'$ is provided with suitable bearings $c^2$ $c^2$ for another series of two or more parallel rods D D which are arranged to slide therein as shown more particularly in Fig. 5, and are engaged at opposite ends with plates $D'$ and $D^2$, the former of which is provided upon its periphery with bearing surfaces $d$ $d$ adapted for sliding engagement with the rods C C, as shown in Fig. 4. By this construction, the section formed from the rods D D, is enabled to slide lengthwise within the other section, and by the engagement of the plate $D'$ with the rods C C, and of the rods D D with the plate $C'$, very firm bearings are afforded therefor and said sliding movements are rendered perfectly rectilinear. As many sliding sections may be provided as desired, the precise construction shown in the drawings comprising three such sections slidingly engaged with each other. In the said device, the plate $D^2$ is provided with bearings $d'$ $d'$ for parallel rods E, secured at their opposite ends to plates $E'$ and $E^2$, the former of which has bearings $e$ $e$ upon its periphery adapted for engagement with the rods E E in the manner before described. In like manner, a fourth section comprising parallel rods F F is engaged with the last described section, the rods F F being secured at opposite ends to plates $F'$ $F^2$ the former having bearings $f f$ for engagement with the rods E E, and the rods F F being arranged to slide in bearings $f'$ $f'$ in the plate $E^2$. The plate $F^2$ at the outer ends of the rods F F is conveniently provided with a horizontal extension $f^2$ which carries a vertically disposed post or support G within the upper end of which is stepped a standard $G'$ carrying at its upper end, the usual flexible shaft $G^2$.

H represents the driving pulley which may receive its power from any desired source such as an electric or other motor or from a line shaft. Upon the lower end of the spindle $B'$ is secured a yoke I, the same being keyed or pinned to the said spindle as at $i$ and carrying two pairs of pulleys $I'$ and $I^2$, respectively journaled upon transverse shafts $i'$ and $i^2$. Another pair of pulleys J J is journaled upon a vertically movable block $J'$, which is provided with apertured ears $j$ $j$ slidingly engaged with vertical guide rods K K which are secured at their upper ends to the yoke I, and at their lower ends to a cross piece K' which is pivotally supported as at k upon a suitable supporting bracket K², the said pivotal connection k being made in line with the axis of the spindle B'. A suitable weight J² is suspended from the block J' as shown.

At the lower end of the post G, is conveniently provided a lateral projection L upon which is journaled a pair of pulleys L' L' as shown, and an actuating pulley M is secured upon the driving spindle of the flexible shaft G² in the ordinary manner.

Power is transmitted from the pulley H to the flexible shaft by means of a suitable belt or cord trained over said driving pulley H, and over the pulley I', beneath pulley J, over pulley I² and beneath pulley L' at one side of the device, said belt being then trained over the shaft actuating pulley M, and is passed below pulley L' over pulley I², below pulley J and over pulley I' at the other side of the device and thence back to the driving pulley H.

Power applied to rotate the driving pulley H, will obviously be transmitted by belt H' and the several pairs of pulleys, to the shaft actuating pulley M, causing the same to revolve and drive the flexible shaft G² in an obvious manner.

It will be observed by reference to the drawings, that the central portions of the plates C', D', D², E', and E² are cut away, to permit the several sections to be slid one within the other so as to occupy but very little space.

By the revoluble engagement of the supporting sleeve B with the bearings a a, as described, the bracket is permitted to be swung about said bearings to any desired position, and the cross piece K' which supports the guide rods K K being pivotally supported at k, in line with the bearings a a, the upper ends of said guide rods being engaged with the yoke I carried by the revoluble spindle B', the said guide rods are permitted to turn laterally with the extensible bracket so as to always maintain the pulleys J J in line with the pulleys I' I' and I² I².

By the arrangement of the pulleys J J upon the vertically movable block J', said block together with said pulleys and the weight J² being sustained by the engagement of the pulleys J J with the belt H', the said pulleys will obviously be raised when the sliding sections of the bracket are drawn outwardly, and when the said sections are slid together the weight J² will cause the pulleys to descend and take up the slack of the belt. In this manner, an even tension of the belt is preserved, while permitting perfect freedom of movement of the bracket sections.

The size of the weight J² may be varied so as to produce any desired tension upon the belt.

By my improved construction a very neat and compact form of bracket is provided, and one which may be readily moved into any desired position, the sections being easily extended or slid together so as to give any desired length to the bracket.

As a further and separate improvement, I prefer to provide upon one of the pulleys I², a guard i³ extending upwardly over said pulley so as to prevent the belt from slipping off from said pulley, this feature being found convenient and valuable in the construction of dental brackets, more especially where the operator desires to give a quick backward motion to the belt so as to revolve the flexible shaft backwardly for the purpose of unscrewing a tool carried by said shaft, in which case the belt is more liable to fly off from the pulleys than when it is running steadily forward.

Having described my invention, what I claim as new, and desire to secure by Letters Patent of the United States, is—

1. An extensible tool carrying bracket comprising two or more sections each composed of two or more parallel rods or bars, secured at their opposite ends to suitable transversely arranged plates, and the rods of each section having sliding engagement with the plates upon the adjacent sections, substantially as set forth.

2. An extensible bracket comprising two or more sections each composed of two or more parallel rods or bars secured at their opposite ends to transversely arranged plates, and the rods or bars of each section having sliding engagement with the plates upon the adjacent sections, the section at one end of the series, being pivotally engaged with a suitable support, and the section at the opposite end of said series being provided with a suitable adjustable support for the tool actuating mechanism, substantially as set forth.

3. The combination with an extensible tool carrying bracket comprising two or more sections having sliding engagement with each other and pivotally engaged at one end with a suitable support, suitable transmitting and tool actuating pulleys journaled upon said bracket, a belt trained over said pulleys and leading to a suitable source of power, vertically disposed guides secured at their upper ends to the bracket adjacent to its pivotal support, and at their lower ends engaged with a cross-piece pivotally supported in line with the pivotal support of the bracket, and a weighted frame having sliding engagement with said vertical guides, and carrying pulleys engaged with loops in said belt, substantially as set forth.

In testimony that I claim the foregoing I have hereunto set my hand, at Milwaukee, in the county of Milwaukee and State of Wisconsin, in the presence of two witnesses.

HORACE HOBBS.

Witnesses:
H. G. UNDERWOOD,
JOHN E. WILES.